INVENTOR.
Joseph H. Wally, Jr.

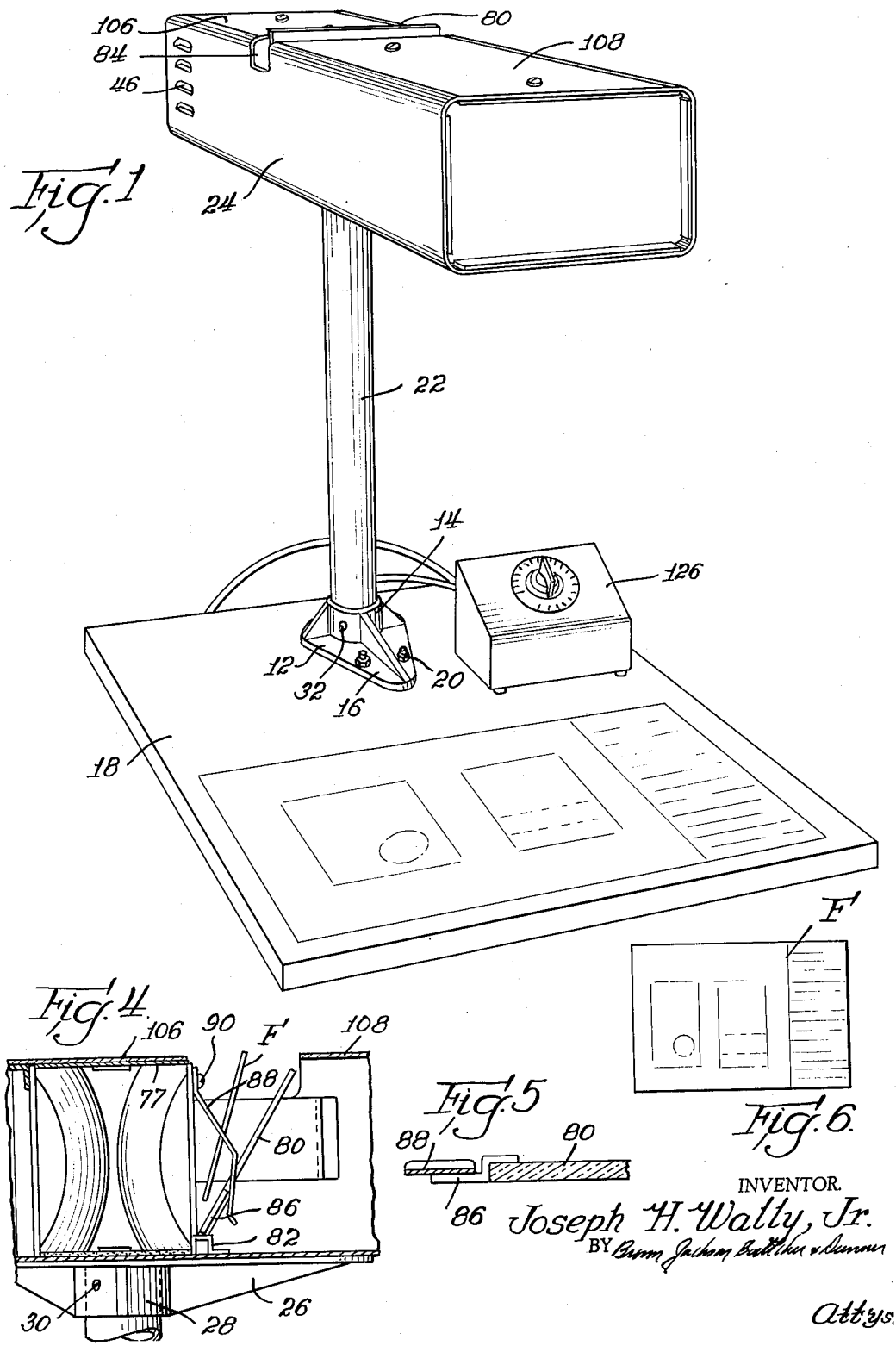

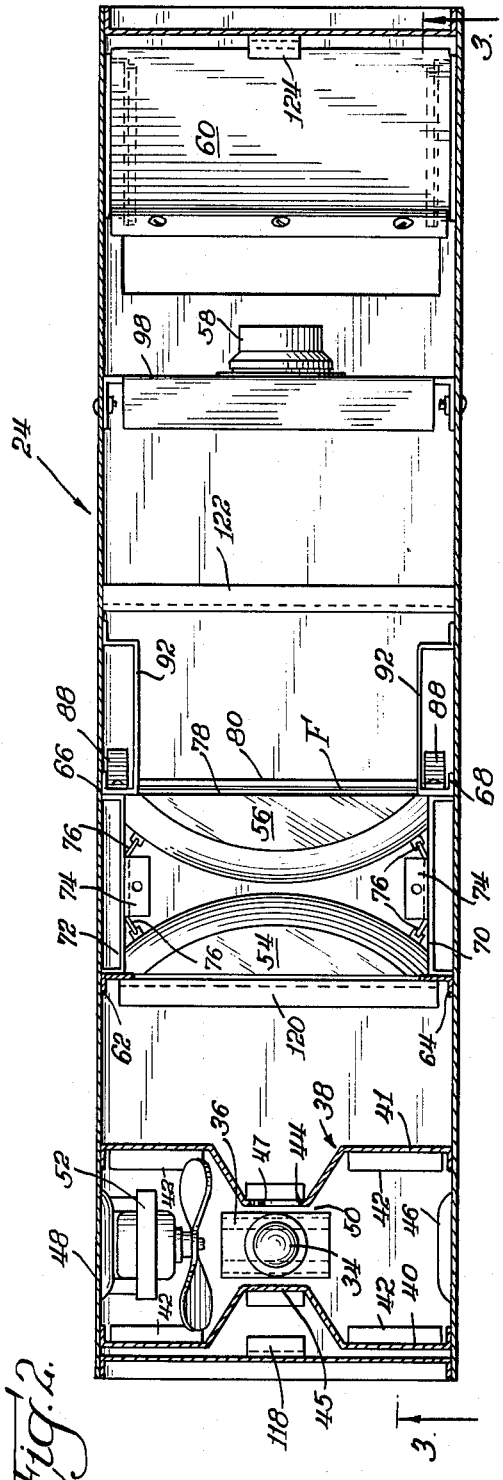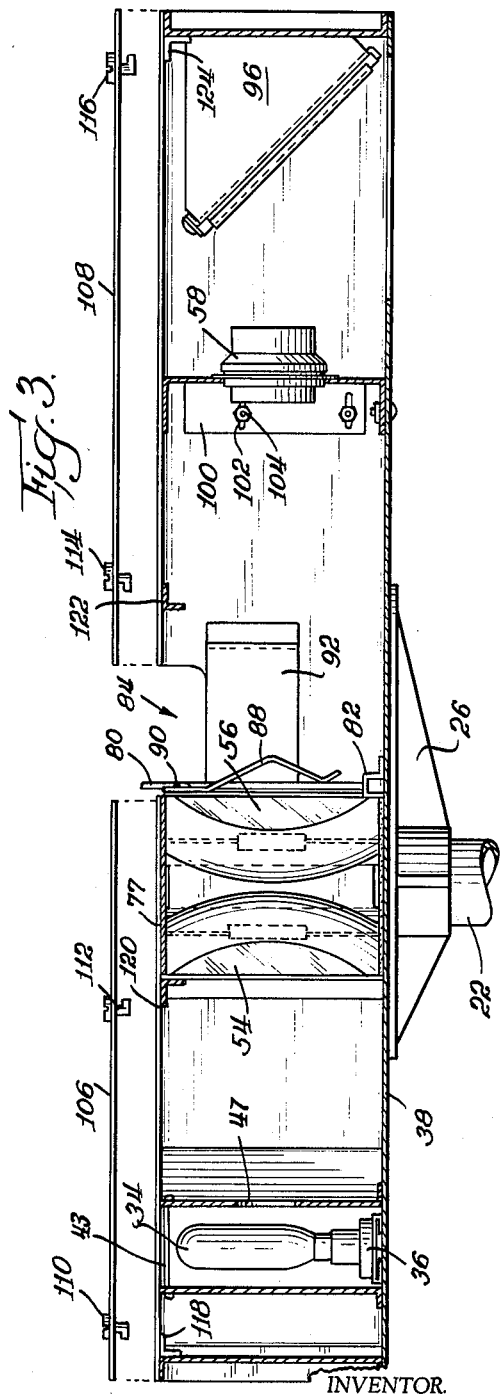

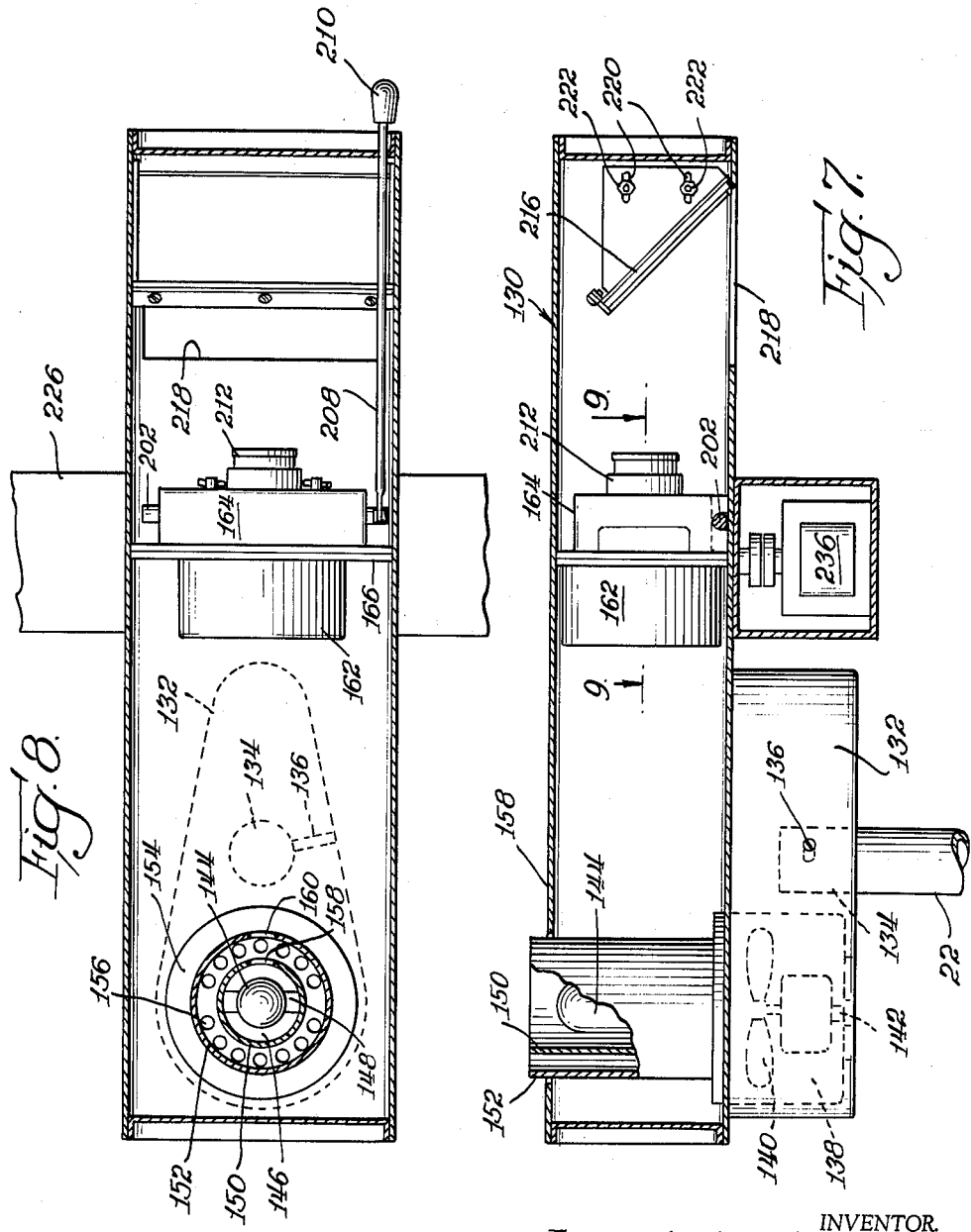

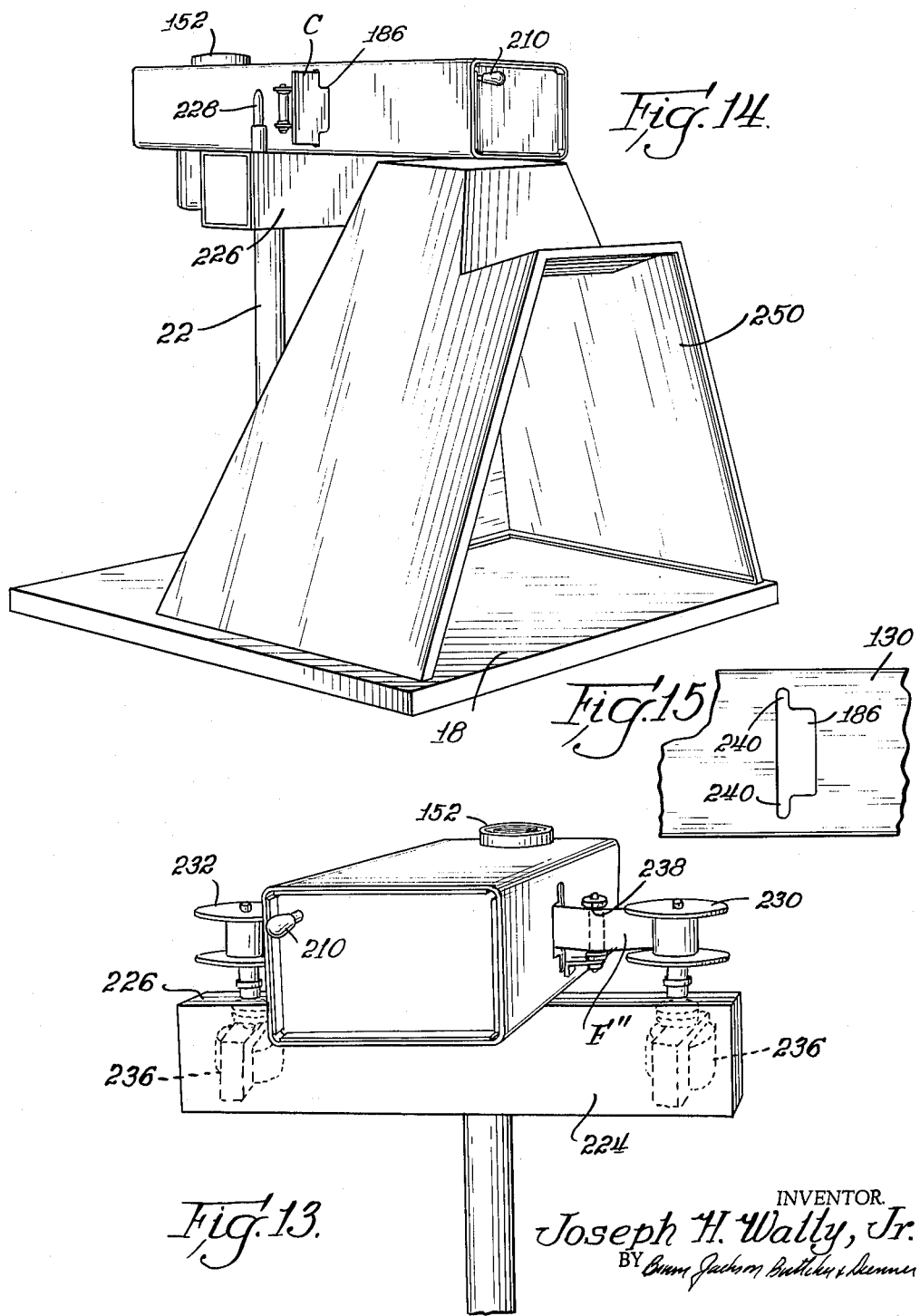

United States Patent Office 3,253,501
Patented May 31, 1966

3,253,501
COLUMN-SUPPORTED VIEWER-PRINTER
Joseph H. Wally, Jr., Shawnee Mission, Kans., assignor to Western Blue Print Company, Kansas City, Mo., a corporation of Missouri
Filed Dec. 3, 1962, Ser. No. 241,749
9 Claims. (Cl. 88—24)

This invention relates to optical devices and more particularly to a novel and improved construction of viewer-printers.

Traditionally, microfilm viewers have comprised a cabinet which may be set on a desk top or other surface and have a translucent screen on their front side through which a magnified image may be viewed on a film. The optical systems thereof which comprised the usual light source, condenser lens, film holder and objective for focusing a magnified image of the film on the screen was located either on the top front or bottom front of the cabinet for operator-accessibility. Often the system was folded to achieve maximum compactness. Frequently the screen was provided with a hood which would extend across the top and sides to shield the rear projected image so that it would appear more bright and therefore more easily discerned on the screen. In another known viewer, the cabinet has a port cut through one side thereof and the optics are provided on the top of the cabinet so as to project an image onto the floor of the cabinet which is viewed by the operator looking through said port. The bulk of such structures has not only created problems of working space but also has limited accessibility of the projected image for viewing by more than one or two individuals at the same time. Several of such viewers have also been provided with access openings or doors as well as holders so that sensitized paper could be placed on the screen so as to be useful also as a printer.

It is a principal object of the present invention however to provide a viewer-printer having its light source, optical components and film holder arranged in a housing supported in an overhead location by a pedestal-borne upright of small diametered cylindrical configuration which allows the device to be conveniently mounted on a drafting table, desk or other horizontal surface while taking up only a minor fraction of the working area of said surface.

A further object and/or feature of the invention is to arrange said housing and the optical components including the light source, condenser lenses, film holder and objective along a horizontal axis and to employ a suitably angled mirror in front of the objective which projects a magnified image of the film onto the horizontal surface of the desk, table or supporting base over which the optical components are spaced.

It is thus a feature of the invention that the viewer-printer does not require a translucent screen on which to view the projected image, but the image may be projected onto a horizontally disposed opaque surface which may also be whitened and otherwise treated to intensify the image. This may comprise a thin white opaque plate or easel to which the pedestal mounted post supporting the optical head may be attached and which easel is set on the table top or desk to serve its function in an unobtrusive manner. It may be made large or small and of thinness so as to be useful itself as a part of the working area which the table top or desk would otherwise provide. The post might also be attached by *means* of its pedestal directly to the table or desk top at which event the table top would become the screen on which the magnified image is projected.

A further feature of the arrangement is that the light source is placed in an overhead location behind the pedestal-borne post which supports the projector head so that it is remote from the normal position of the operator in front of the viewer-printer and where heat therefrom is least troublesome to the operator.

A further feature and/or object of the invention is the provision of a novel construction of air channeling means which is associated with a fan when the lamp comprising the light source is energized which efficiently removes the heat of the lamp from the projector housing so that it will not injure the film.

In one form of the invention the air channeling means takes the form of a Venturi tube having a restricted throat in which the lamp is located and air is withdrawn over the top as well as two sides of the lamp.

By reason of the aforesaid remote location of the light source and the novel arrangement for withdrawing the heat therefrom, it has been found possible to use lamps of sufficient magnitude that the image projected onto the opaque screen will have an intensity such that it is easily visible in a normal light level and so that the projected image does not require the protection of a hood except under unusual conditions of external lighting.

Therefore an important feature and/or advantage of the present invention resides in the use of a pedestal-borne cylindrically-shaped upright by which the optical compartment is supported in spaced overlying parallel relation with the supporting surface to achieve first, a magnified image which may be viewed in a horizontal plane at conventional table or desk top height and one which is substantially unobstructed through a viewing circle of nearly 360°. This is true because the support on which the projector head is supported can be made strong and rigid to support the projector head and also be of small diameter so that it does not obstruct the view of individuals standing about the table to view the horizontally disposed image. This means that the image can be viewed by many persons all at one time. Neither is it necessary for an individual to be in front of the viewer in order to see the image and to inspect details.

A further feature and/or advantage of the invention which derives from being able to project an image on a horizontal surface at table height which is unhooded and therefore accessible, as well as viewable, from all directions is that it not only permits the individual or individuals to read the flat image in a normal position, but also it permits one to trace segments of the image on paper if he desires or to measure dimensions of a drawing at the level of the table which actions are more normal as well as convenient and simple to carry out than when attempting to conduct such acts on a vertical glass screen.

When the device is being used as a printer the placement of the sensitized material is also more simple as well as convenient. There is no need for complicated paper holding means or slots or access doors in a cabinet. The sensitized paper need only be located flat on the horizontally disposed surface beneath the optical compartment. A particularly useful possibility is that of actually laying the sensitized sheet in printing position and also removing it while the light source remains on, without causing a blurred image, assuming the use of slow speed printing materials commonly called "room handling materials." This is possible because the placement or removal can be done so quickly and easily that materials which by their very nature can be handled in room light for relatively short periods with safety can still be projected upon with an adequate image and without blurring.

A further feature of the invention is that because the optical compartment is mounted by means of a pedestal-borne cylindrical support several mounting pedestals can be provided, one at each of several different loactions, as for example, on several tables in a drafting room. This will permit the viewer-printer to be conveniently moved from one table to the other so that it will be useful at several work stations.

Furthermore, since the only compartmentation required is to house the several optical components including the light source and film holder, these can be arranged in a small and elongated compartment which will be attractive in appearance, and by reason of its overhead horizontal position will be unobtrusive as well as lacking bulk to interfere with the normal use of the table or desk. It also will be less expensive to manufacture when compared to the more usual viewers provided with bulky cabinets and other provisions for shielding the image screen.

Another feature of the invention is that because of the location of the optical components in an overhead, horizontally disposed compartment, a single first surface plane mirror suffices to project the image onto the horizontal easel surface beneath and it is not necessarily to fold the optical path of the projected light to save space or for any other reason.

Because the components of the optical system are arranged in unfolded horizontal straight line configuration, they are conveniently accessible for servicing or cleaning. The first surface mirror is located at the front with its reflective surface angled downwardly so that it does not tend to catch dust. It is also conveniently accessible through the aperture in the bottom wall of the compartment which is approximately of equal size to the mirror. The operator can therefore look up at the mirror easily to see whether it is clean and also to clean it if necessary. Furthermore, the objective lens is sufficiently close to this aperture that it is also easily reached and cleaned. Its focus may also be adjusted by the operator reaching his hand up through the opening and turning the barrel of the objective lens mount.

A further feature of the invention is the provision of of access panels on the top of the compartment which are easily removed for cleaning of the condenser elements, replacement of the lamp or servicing of the fan motor. With the removal of these compartment covers, various adjustments as well as focusing of the image can be taken. Significantly, this work can be attained while the image is being viewed. This is possible because stray light which the system emits while the covers are off will be directed to the ceiling where it is of little consequence and not into the eyes of the person which will usually be below the top of the projector housing top and directed toward the projected image visible on the table top when making the adjustments or focusing.

A further feature and/or object of the invention is the employment of novel film holding means which utilize the planar surface of the front condenser in concert with a pressure glass to hold the film flat and in the plane of the condenser leans. In one form, the pressure glass takes the form of a thin glass plate of a size at least that of the film and having projection at its two sides near their bottom which are engaged by resilient bent blade springs so that it may be swung back about its bottom edge by pulling on its top to allow insertion of the film and on its release will be returned to hold the film flat against said planar surface of the condenser lens. In another form of the invention the pressure glass is mounted within a withdrawable casting operated through a suitable yoke and handle actuatable from the forward end of the optical compartment so that it may be moved toward and away from the plano side of the condenser to allow the insertion and removal of film.

It is a further feature of the invention that the holder is adapted for loading and unloading of a single piece of film either alone or when mounted in an acetate sleeve or other auxiliary aid, such as a card frame or aperture card or film holder. The invention also contemplates means whereby it may be used with roll film.

A further feature of the invention is the reliance upon a single supporting post or tube to support the projector head, which permits one to easily vary the magnification setting of the viewer-printer. Thus, degrees of magnification can be altered by simply cutting off a portion of the length of the supporting tube or post or replacing it with a longer one, if a greater magnification is sought. Therefore, without changing the lenses, a user can adapt the viewer-printer to the size of the particular area he has on which the project the image.

A further feature of the invention is that it is also possible to calibrate the focus of the viewer-printer to a particular camera by merely adjusting the fix of the supporting post to either or both the mounting flanges by which it is connected to the underside of optical compartment and table top or base. This is of importance because as a practical matter, no two miniaturization cameras will shoot exactly the same degree of reduction, except by happenstance.

Many other objects, advantages and/or features of the invention will be apparent or will become so from the description of embodiments of the invention which will now be described. In the description of such embodiments it will be understood that the same are not to be taken in a limiting sense but that the described embodiments are to be considered merely as illustrative of the invention and that many changes, rearrangements and modifications of these parts may be had within the spirit of the invention as defined by the claims.

Referring now to the drawings, FIGURE 1 is a front perspective view of a preferred embodiment of the invention;

FIGURE 2 is a top plan view of the projector housing with the top covers removed to show the arrangement therein of the components which are housed thereby;

FIGURE 3 is a side elevational view of the projector housing looking in the direction indicated by arrows 3—3 of FIGURE 2 with the first wall removed for convenience in viewing the components thereof;

FIGURE 4 is a fragmented view to illustrate the film holder and its manipulation to permit inserting a film;

FIGURE 5 is a fragmented showing of the pressure glass of the film holder and illustrates details of one of its projections in its cooperation with a retaining spring;

FIGURE 6 illustrates a piece of film which may be inserted in the projector housing and against the plano side of the forward condenser for viewing a magnified image thereof on the horizontal easel or desk top below;

FIGURE 7 is a vertical sectional view, partly fragmented, taken through the projector housing of a second embodiment of the invention;

FIGURE 8 is a top plan view of said projector housing with the cover removed;

FIGURE 13 is a fragmented perspective view of said second embodiment illustrating its use with rolled film;

FIGURE 14 illustrates its use with a card such as shown in FIGURE 12 and combined with a hood for limiting extraneous light on the projected image; and FIGURE 15 is a fragmented view of one side of the housing to illustrate the shape of the film slot therein.

Figure 9:
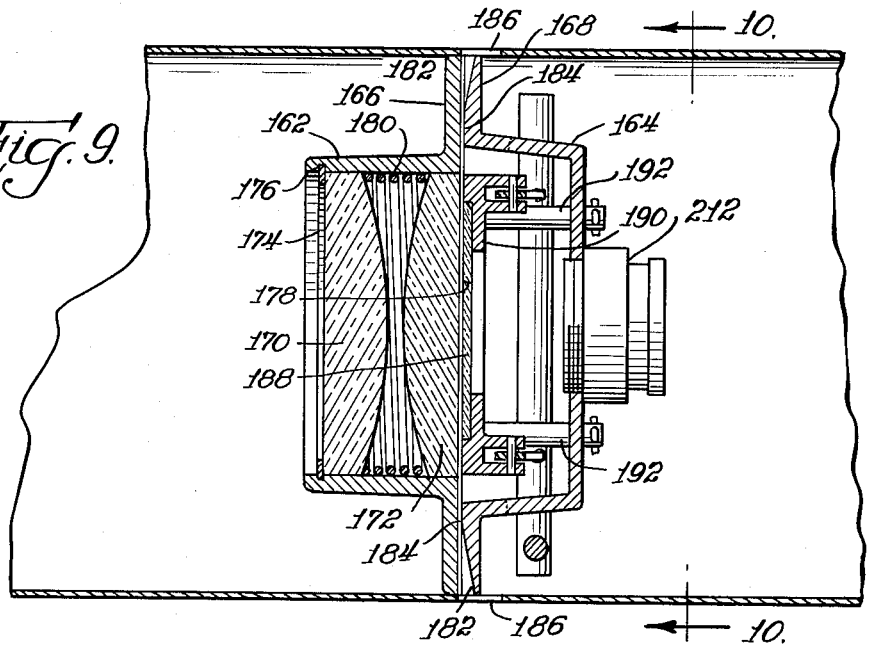
FIGURE 9 is a horizontal sectional view taken along the lines 9—9 in FIGURE 7 looking in the direction indicated by the arrows.
Figure 11:
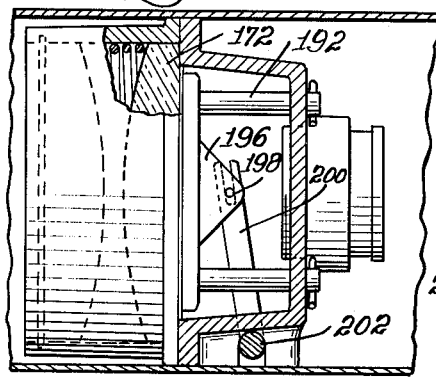
FIGURE 11 is a view taken partly in vertical section along lines 11—11 in FIGURE 10 looking in the direction indicated by the arrows.
Figure 10:
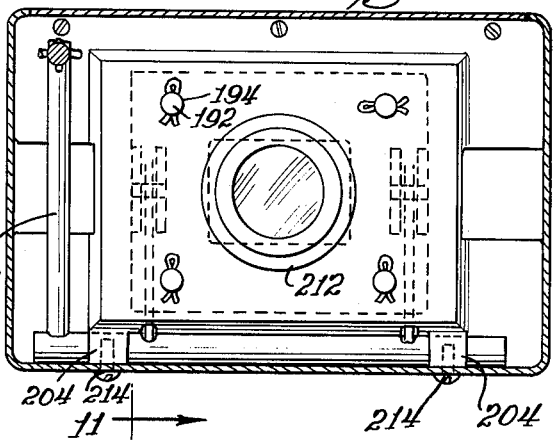
FIGURE 10 is a view taken along lines 10—10 in FIGURE 9 looking in the direction indicated by the arrows.

Referring more specifically to the several views wherein like parts are identified by like reference numerals, and first to FIGURES 1 through 5, one embodiment of the invention is shown to comprise a pedestal 12 having a socket portion 14 accessible from its top side and a mounting bottom flange portion 16 by which it is attached to a base 18 as by bolts 20. Base 18 preferably comprises a rectangular easel of opaque white formica and is relatively thin so that when rested on a desk top, a drafting table or the like, it does not protrude to any substantial amount above the surface and for many purposes may be used as though it were a portion of said surface. It will be understood that pedestal 12 may be also directly bolted or otherwise secured to any convenient supporting surface such as the aforementioned draftsman's table or desk. In this event, the user may find it advantageous to spread out a piece of white paper or other light colored material in front of pedestal 12 and beneath projector head 24. This will provide greater contrast in the projected image than would the dark color of the conventional desk top. Removably seated in socket portion 14 is a tubular column cylindrical upright or supporting post 22 purposely of a small diameter or cross section which will not interfere to any great extent with the accessibility of easel 18 or its viewing to people standing thereabout. Housing 24 which contains the optical components comprising the projector as hereinafter described, is provided with a mounting flange 26 bolted or otherwise secured to its underside. Said mounting flange 26 is provided with a socket portion 28 which receives the upper end of tubular support 22. Mounting flange 26 is located intermediate the forward and rear ends of the housing but nearer to its rear end so that the housing projects forwardly over the base or easel 18. Mounting flange 26 as well as pedestal 12 are given the illustrated shape to stably mount and support projector head 24 with its components in a rigid fixed mobile position over easel 18 while permitting post 22 to be of relatively small cross section or diameter. To avoid turning of the projector housing 24 on its support 22 and to maintain its alignment with the easel 18 beneath, means such as set screws 30 (FIGURE 4) and 32 (FIGURE 1) may be provided in the portions of flange 26 and pedestal 12 forming socket portions 28 and 14, respectively.

Referring now to FIGURES 2 and 3, projector housing 24 provides enclosing support for a lamp 34 mounted in an appropriate socket 36 secured to the bottom wall 38 of the projector housing 24, a pair of plano-convex condenser lenses 54, 56, objective 58 and first surface plane mirror 60. Lamp 34 is located in the rear end of the projector housing 24 so that it is behind mounting flange 26 and thereby upright 22 whereby heat emitted therefrom will be least evident to the operator who will normally be standing in front of the apparatus. Means are indicated generally at 38 by which currents of air are drawn from outside the housing 24 through louvers 46 across and above lamp 34 and out louvers 48 in the opposite wall of the housing 24. Such means comprise a Venturi channel having flared ends and an intermediate restricted throat, the same being constituted by sheet metal panels 40 and 41 which extend laterally of the housing and have flanged portions 42 by which they are welded to the bottom wall of the housing 24. Lamp 34 is located in the restricted throat area 50 of said Venturi channel and a fan 52 is located in the one of the two flared ends of said channel adjacent louvers 48. Fan 52 is connected into the lamp circuit so that the fan is turned on and off with energizing and de-energizing of the lamp 34. A removable cover 43 is provided with turned ends which catch with wall portions 44 and 45 of panels 40 and 41 comprising restricted throat 50 of the Venturi channel and so as to overlie the top of the lamp 34. Relatively narrow passages are therefor provided along either side and top of lamp by reason of wall portions 44, 45 and cover 43 respectively so as to increase the Venturi effect, and whereby a maximum withdrawal of the heated atmosphere about lamp 34 can be obtained using a relatively small fan operating at a slow rate of speed. Wall 45 has a small aperture at 47 by which its light may be directed to the condenser lenses 54 and 56 which are convexo-planar in shape and conventionally arranged with their convex sides facing each other. The forward plano side 78 of condenser lens 56 serves in conjunction with pressure glass 80 as hereinafter described to hold the film F flat and in a plane normal to the axis of the condenser lenses. Since the condenser lenses 54, 56 serve to collect light from lamp 34 escaping through opening 47 and direct it through the film F to the objective for enlargment and focusing, it is not necessary that the condenser lenses be much larger than the film size. Thus, for example, where the apparatus is to be used with 105 mm. film having approximate dimensions of 4" x 6", larger diameter lenses may be trimmed to 5" x 7". This not only allows the cross section of housing 24 to be of minimum size but the resultant four flat sides of the two condenser lenses 54, 56 prove useful in stably mounting them in compartment 24 against lateral or axial movement or twisting. For best balance, the condenser lenses are centered over post 22 and mounting flange 26 (FIGURE 3) and a pair of vertically disposed angle members 62 and 64 are welded to the two side walls of the projector housing 24 to provide means against which the lateral edges of the planar side of the front condenser lens 54 will engage. A second pair of angled members 66 and 68 are similarly welded to the side walls of projector housing 24 to provide means against which the planar side of the rear condenser lens 56 will engage abutment members 70 and 72 are end welded to angle pieces 64 and 68, 62 and 66 respectively to inhibit lateral movement of the condenser lenses. Welded to said abutment members 70 and 72 are spacers 74 having rubber tipped forwardly and rearwardly extending tension fingers 76 which bear against the convex side of the two condenser lenses to resist their axial dislodgment from angled pieces 62, 64 and 66, 68. A separate cover 77 may be removably connected to the flanged ends of spacers 74 to provide a dust cover for the convex side of the condenser lenses.

Across the bottom edge of forward condenser 56 and welded to angle pieces 66, 68 is an inverted channel bar of sheet metal 82 on which the lower edge of transparent cover or pressure glass 80 rests. It also serves as a bottom limit for film F when inserted between the plane side 78 of lens 56 and cover plate 80.

To accommodate the insertion and removal of film F, the top wall of projector housing 24 is provided with a relatively wide slot 84 across the width thereof and through which the upper edge of plate 80 extends (FIGURE 1). Referring to FIGURES 4 and 5 at the bottom of the two sides of transparent cover glass 80 are adhesively secured a pair of projections 86, 86, against which engage the free ends of bent blade springs 88, 88, the upper ends of which are secured as by screws 90 or the like to angle pieces 66 and 68. Springs 88, 88 therefore serve to hold plate 80 against surface 78 or film F inserted between surface 78 and plate 80. However plate 80 may be conveniently retracted axially with respect to the axis of the optical system which the light source 38, condenser lenses 54, 56, objective 58 and mirror 60 comprise and about its lower edge resting on channel piece 82 as a fulcrum and akin to a hinging action.

Parallel pieces 92 comprising extensions of angle pieces 66, 68 and having their opposite ends welded to the housing sidewalls act as guides in the hinging or axial retraction of plate 80 to prevent its lateral displacement. Thus conveniently operable but highly effective film holding means are provided which hold the film flat and in the plane of the condenser lenses.

Objective lens 58 may comprise any well corrected objective lens of desired focal length to project an image which on reflection by mirror 60 to easel 18 will be of desired magnification and area size in accordance with the height of post 22. Mirror 60 is shown supported in channeled member 96 so as to be angled at approximately 45° with respect to the horizontal axis of the objective 58 and condenser lenses 54, 56. Objective lenses 58 are shown mounted in an adjustable barrel to accommodate focusing and in turn on a panel 98 having vertical flanged ends 100 formed with horizontally disposed elongated slots 102 through which bolts 104 extend for securing to the side walls of the projector housing. The elongated horizontal shape of horizontal slots 102 permits variation in the spacing of the objective relative to the mirror and to the front surface of condenser lens 56 to accommodate further adjustments in obtaining proper focus of the film F on the image plane or horizontal surface of the easel or base 18. It will be appreciated that by shortening post 22 or substituting a post of greater length so that the housing 24 is supported at a greater height, the magnified size of the projected image on easel 18 can be made larger or smaller and the aforesaid adjustments by the position of the objective 58 to the condenser lens will accommodate focusing at said new magnification factors. For convenience in cleaning as well as adjusting the various components, a pair of access covers 106 and 108 are provided on the housing. The cover are provided with latches at 110, 112, 114 and 116 having a slotted top so that they may be turned by a screw driver and which catch beneath respective flanges 118, 120, 122 and 124. By reason of the overhead location of the projector housing, it will be apparent that upon removal of the covers, an operator standing in front of the apparatus sitting on a desk or otherwise at table height, may reach his hand over the housing and into the interior and axially adjust the position of panel 98 as well as rotate the barrel mounts comprising objective 58 to as to bring into proper focus on easel surface 12. This he can do while looking down at the projected image on the easel 18 and without stray light from the lamp blurrring his vision or the image viewed on the easel.

As described, the invention is particularly useful for projecting magnified images of 70 and 105 mm. size films. Such pieces of film ordinarily will not require special card mounts but the film pieces themselves may be directly mounted against surface 78 of condenser 56 by pulling back the top edge of plate 80. Either a 3× or 4× magnification has been found useful for magnifying films of 105 mm. although obviously the invention is not limited to any magnification factor but this is determined by the requirements of the particular user and the length of post 22 and selection of objective 58 is made with this in mind.

A timer 126 may be provided if desired to permit controlled variation in timing of the light source 34 to determine the exposure of sensitized material being printed on the easel when the viewer is being used as a printer.

Figure 12:
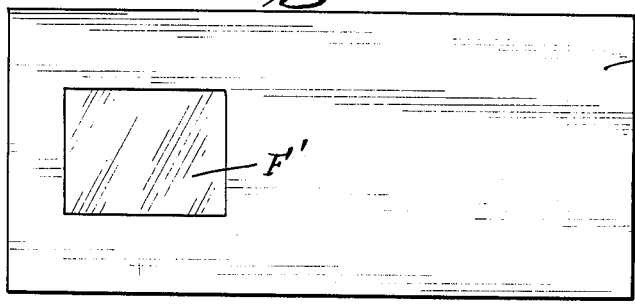
FIGURE 12 illustrates a card in which is mounted a piece of film which may be inserted in the embodiment of the invention according to FIGURES 7 through 11.

The apparatus as thus far described is particularly useful in that film pieces can be inserted and removed with one hand because of the easy manipulation of plate 80, thus leaving the operator's other hand free. The apparatus will also be useful with film sizes smaller than 70 mm., although obviously for convenience in handling they will be preferably mounted in a card such as is illustrated in FIGURE 12.

In FIGURES 7 through 13 a second embodiment of the invention is utilized, which is particularly useful with roll film although, as will hereinafter be seen, it is not restricted to such use. Thus referring first to figure-projector housing 130, corresponding generally to housing 24 of the first described, is provided with a casting 132 having a socket 134 which fits over the smooth upper end of cylindrical mounting post 22. Set screws 136 serve to prevent turning of the housing 130 on its connection in socket 132 with post 22. As previously described, post 22 has its lower end removably secured against turning in the socket portion of a pedestal 16 by which the device is attached to an easel board 18 or directly to a table top, desk or other working surface.

Casting 132, however, differs from mounting flange 26 (FIGURES 1–6) in that its rear end also comprises a chamber 138 for fan 140 by means of which air is withdrawn through opening 142 in the bottom of casting 132 and forced upwardly about lamp 144 supported in opening 146 aligned with fan 140 by cross piece 148 and through an opening in the top of removable cover 158 of housing 130. Enclosing lamp 144 are a pair of concentrically arranged cylindrical lamp shields or envelopes 150, and 152 mounted by flange 154 to the bottom wall of housing 130 and about opening 146 therein. In the portion of flange 154 on which inner shield 150 is supported are a plurality of openings 156. Shields 150, 152 extend above the height of lamp 144 and out through said provided opening in the removable cover 158. Fan 140 is also connected into the circuit which energizes lamp 144 so that when lamp 144 is energized it forces air upwardly not only from about the lamp itself but also through the restricted channel formed by means of the concentric narrow-spaced shields 150, 152 to accelerate removal of heat generated by the lamp upwardly into the adjacent atmosphere. As in the first embodiment, the lamp mounting is located above the rear of easel 18 and behind supporting post 22 in a location remote from the operator who is working in front of the device and who will therefore be largely insensitive to heat being generated and forced upwardly out of housing 130.

Aligned opening 158 in shield 150 and opening 160 in shield 152 provide an exit of light rays from the lamp for collection by a pair of plano-convex condenser lenses which are supported forwardly of the lamp in a two-part casting or mount. Referring to FIGURE 9 the two halves of this casting are represented by reference numerals 162 and 164 and have rectangular shaped mating flanges 166, 168 which are joined by screws placed along their top and bottom portions but not along their two sides for a reason which will later be obvious. Casting part 162 serves as the mount for condenser lenses 170, 172. Retainer ring 174 seated in an appropriate notch 176 serves as an abutment against which the periphery of the plano side of the rear condenser 170 engages. Casting part 164, although wider than part 162 considered in the horizontal, is narrower than the opening through part 162 considered in the vertical so that its flange part 168 when attached to flange 166 serves as an abutment for the top and bottom peripheral portions of the front planar side 178 of the front condenser 172. A spacer spring 180 disposed between the two condenser lenses resiliently bears against the periphery of their convex sides to hold the lenses in their required spaced axial alignments and against the abutments formed by retainer ring 174 and the top and bottom portions of flange 168. The sides of flange 168 are beveled as at 182 (FIGURE 9) to provide a flared end for film slot 184 provided by recessing the two sides of flange 168. Suitable openings 186 are provided in the two sidewalls of housing 130 in alignment with the film receiving slot to accommodate the positioning of film therethrough and in front of condenser lens 170. Pressure glass 188 which corresponds in function to glass 80 in FIGURES 1–6 is mounted in the recessed rear side of a frame 190 as by adhesively securing its peripheral edges in the recess of said frame. Four parallel pins 192 are rigidly mounted to the rear side of frame 190 and are freely slidable through provided openings 194 in the rear wall of casting part 164. Pins 192 therefore serve to allow axial retraction of pressure plate 188 while confining the same against lateral movement. Also projecting rearwardly of frame 190 are a pair of lugs 196 dispoesd midway of the top and bottom of said frame. Lugs 196 support a pair of pivot pins 198 which are arranged in horizontal and aligned relation with each other. Engaged with said pins are the bifurcated ends of rocker arms 200 having their lower ends rigidly connected to a shaft 202 rotatably supported in a pair of bearings 204. Rigidly connected to one end of shaft 202 is a second vertically extending arm 206 pivotally connected at its upper end to an actuator or plunger arm 208 (FIGURE 8) which extends forwardly through one upper corner of the front wall of projector housing 130 and has a knob 210 on its externally located end for convenience in grasping. Thus the operator by pulling on knob 210 can move frame 190 and its supported pressure glass 188 away from the plano side 178 of condenser lens 172 to permit insertion of film and may thereafter push in on knob 210 to return the plate 188 and hold the film flat against said plano side 178 of the condenser lens 172.

Turning again to FIGURES 7, 8 and 9, casting part 164 also serves to center objective 212 with respect to condenser lenses 170, 172 and at a desired distance forwardly thereof. Flanges 166, 168 are desirably rectangularly shaped and dimensioned to correspond to the inside dimensions and cross sectional shape of housing 130 and the casting is secured to the bottom wall of housing 130 as by screws 214 (FIGURE 10) which threadedly connect into bearings 204. Mirror 216 which corresponds to the front surface plane mirror 60 of FIGURES 1-6 is similarly supported forwardly of the objective and at 45° to the axis thereof by mount 216 so as to reflect the projected image downwardly through opening 218 to the horizontal surface of easel 18 or other work area below. Because the casting parts 162, 164 are rigidly mounted against axial as well as lateral movement in the manner aforedescribed, mirror mount 216 may be provided with horizontal extending elongated mounting slots 220 to accommodate adjustment of the axial spacing between mirror 216 and objective 212 by loosening connecting bolts 222.

As previously mentioned the embodiment of FIGURES 7-13 is adapted for use with roll film. For this purpose motor compartment 224 (FIGURE 13) is secured to the underside of projector housing forwardly of post mount 132 and so as to project outwardly to either side thereof approximately at right angles and adjacent the previously decsribed film entrance and exit openings 186 provided in the two sidewalls of projector housing 130. The top side 226 of motor compartment 224 serves to support a pair of spindles 228, one to either side of the projector housing. On one of said spindles 228 may be located a loaded reel 230 and on the other spindle a take up reel 232. Spindles 228 are drivingly connected to the arbor of a pair of motors 236 through appropriate clutches (not shown). One of said motors 236 is adapted to turn its arbor in a clockwise direction, the other in a counterclockwise direction and the clutching is so arranged that a spindle associated with the energized one of the two motors will turn therewith and in the direction of turning of its arbor. However, the other spindle will be able to turn free of the non-energized motor. Thus the llm can be moved in either direction across the surface 178 of the front condenser 172 in accordance with which of the two motors is energized. Appropriate controls for the motors may be located either on the motor compartment 234 or wired to a remote control center which can be conveniently located in front of easel 18 or at another appropriate location. Auxiliary film rollers 238 may also be located on the sidewalls of the projector housing 130 adjacent the film openings therethrough to take up slack.

The viewer-printer of FIGURES 7-13 may also be adapted for projecting film pieces mounted on cards as illustrated by FIGURE 12. Thus as illustrated in FIGURE 14, although film openings 186 are made relatively wide to accommodate convenience in threading the film through the film gate which pressure glass 188 and the front surface 178 of the condenser lens comprises as well as to provide clearance for the entering and exiting film, said slot also may be provided with upper and lower narrow extensions 240 (FIGURE 15) to its rear which are in exact alignment with film slot 184 between casting parts 162, 164 to accommodate the insertion of card C with film piece F'.

It will be understood that to permit insertion of card C and also to allow free movement of the roll film when one of motors 236 is being operated plunger knob 210 will be first pulled to move pressure glass 188 away from surface 178 of condenser lens 172 or the film F'' as the case may be. The operator by looking at the projected image will know when the correct film frame is in proper alignment with the optical system of the projector housing and at which time will push on the plunger 210, after stopping the motor, to fix the film flat against the condenser lens surface 178. It will also be understood that springs may be located about each of guide pins 192 so as to be compressed when plunger knob 210 is pulled and to automatically return frame 190 and pressure glass 188 when the operator's hold on knob 210 is released.

The embodiment of FIGURES 7-13 may also be provided with a timer 126 connected into its lamp circuit to permit variation in timing when the viewer is performing its dual role as a printer.

Where the film being projected is 70 mm. or larger size, a 300 watt lamp bulb has been found adequate to project an image on the horizontal easel 18 which will be easily discerned and sharp in detail under normal lighting conditions. However, where the film image size is smaller, as for example of 35 mm., the size of the area through which the light can pass from the condensers to the objective is small and so is the amount of light. With such smaller film images, the intensity level of the projected image is also adequate in moderate surrounding light. However, if the surrounding light is exceptionally high, then a hood such as illustrated at 250 in FIGURE 14 may be utilized beneath opening 218 in the projector housing 130 to enclose three sides of the easel 18 and so as to darken the easel area. This arrangement, however, in many instances, is undesirable and can be avoided usually by readjusting the intensity of the surrounding light to a more moderate level.

From the aforesaid description of preferred embodiments of the invention, it will be evident that all of the recited objects, advantages and features thereof have been demonstrated as achievable in an entirely practicable, convenient, simple and economical manner.

Thus having described my invention, I claim:

1. A viewer-printer comprising a pedestal adapted to be mounted on a horizontal work surface, an upright slender tubular rigid supporting cylindrical column rising therefrom and having an upper end on which is removably seated a horizontally disposed housing, the housing having a socket on its underside in which removably fits the upper end of said column, the major portion of the housing projecting forwardly of the upright supporting column and a minor portion of the housing extending rearwardly thereof, a lamp supported within said minor portion of the housing behind the upright support and a mirror angularly mounted in the forward end of the housing to reflect light rays from said lamp downwardly through a provided opening in the bottom of the housing onto a horizontal work surface below the housing on which the pedestal is mounted, said housing containing condenser lens means and objective lens means mounted forwardly thereof in axially spaced alignment between the lamp and mirror, the said lamp, condenser lens means, objective lens means and mirror lying along a common horizontally disposed axis, the housing further having a film slot through the wall thereof immediately adjacent the forward side of the condenser lens means through which film may be inserted for positioning in front of the condenser lens means, and axially retractable means forwardly of the condenser lens means for releasably holding the film against said forward side of the condenser lens means.

2. The viewer-printer of claim 1 wherein means are provided which permit adjustment of the horizontal axial spacing of the objective lens means and mirror.

3. The viewer-printer of claim 1 wherein the housing has transversely extending air funneling means communicating through opposed walls of the rearwardly disposed minor portion of the housing behind the upright supporting column, the lamp being mounted centrally of said air funneling means, and fan means in one end of said air funneling means so as to draw cooling air therethrough across and about the lamp.

4. A viewer-printer comprising, in combination, a pedestal adapted for mounting on a flat horizontal surface and having a socket in its upper side, an upright tubular slender supporting column having its lower end removably seated in said socket, and and elongated horizontally disposed housing having a second socket on its underside intermediate its forward and rear ends and into which the upper end of said support removably seats so as to support said housing with its forward end projecting forwardly over a surface on which said pedestal is mounted and with its rear end projecting behind said support, said housing containing a lamp in its rear end behind the support and channel means about said lamp having an entrance and exit in opposite walls of said housing behind the tubular support and including a fan for drawing cooling air in a confined path about and across said lamp, a first surface mirror angularly mounted in the forward end of said housing to receive light from said lamp and direct the same onto a portion of said horizontal surface forwardly of the pedestal, said housing further containing condenser lens means disposed between said mirror and lamp with a flat surface disposed toward the mirror, a resiliently tensioned transparent pressure plate immediately in front of said flat forward side of the condenser lens means to engage said side and axially retractable therefrom to permit insertion and removal of the film, said transparent pressure plate having a flat rear surface complementing the shape of said flat forward side of the condenser lens means so as to conform a film inserted therebetween to said shape, objective lens means axially aligned with and between said condenser lens means and mirror, and means permitting axial adjustment of the spacing of the objective lens means and mirror in accordance with the height of the tube to obtain proper focus of the projected image on said horizontal surface.

5. A viewer-printer comprising, in combination, a base presenting a horizontally disposed upper flat surface, an upright slender supporting column mounted on said flat surface to the rear thereof, an elongated housing horizontally mounted atop said column such that its forward end projects forwardly of the column over said flat surface of the base on which said column is mounted, an illuminating lamp mounted in the rear end of said housing, condenser lens means fixed therein forwardly of said lamp, objective lens means fixed therein forwardly of the condenser lens means, a reflector element angularly mounted in the forward end of the housing to receive light rays from the lamp through the condenser lens means and objective lens means and direct them downwardly through a provided opening in the bottom wall of the housing to the flat surface of the base below on which the upright column is mounted, said condenser lens means having a flat surface on its side directed toward the objective lens means, said housing including an opening adjacent said forward side of the condenser lens means through which a film may be inserted for positioning against said flat side of the condenser lens, and an axially retractable, thin, transparent cover element in front of said condenser lens means having a rear surface corresponding to the shape of said forward side of the condenser lens means, said transparent cover element being of a size to engage said film throughout the area thereof and operable to press the film against said flat side of the condenser lens element into conformity with the shape thereof, said objective having a focal length such that it will project a magnified image of a so-positioned film onto said surface by means of the reflector.

6. A viewer-printer comprising an upright supporting column, an elongated housing horizontally mounted atop said column such that its forward end projects forwardly of the column and across a horizontal surface on which said column is mounted, baffle means in the rear end of said housing, forming a restricted channel extending transversely through said housing and having its ends communicating with an air entrance and an air exit in opposite walls of said housing, an illuminating lamp mounted within said channel intermediate its ends and a fan mounted in one end of said channel to move cooling air therethrough across the lamp, said baffle having an opening between the lamp and the forward end of the housing which permits exit of light rays from said lamp to the forward end of the housing, a reflector element mounted in said forward end of the housing which receives light rays from the lamp through said opening and directs them downwardly through a provided opening in the bottom wall of the housing to the surface below on which the upright column is mounted, a pair of condenser lenses, and objective lens means fixed forwardly thereof, said condenser lenses and objective lens means being in spaced axial alignment with each other and in the path of the light rays between said lamp and reflector element, the forward one of said condenser lenses having a flat surface on its side directed toward the objective lens means, said housing having an opening in one wall thereof immediately forwardly of the condenser lens means through which a film may be inserted for location against said flat side of the condenser lens and in the path of said light rays, and an axially retractable, thin, transparent cover element which holds the film against said flat side of the condenser lens, said objective lens means having a focal length so as to project a magnified image of a so-positioned film onto the horizontal surface on which the viewer-printer is mounted.

7. A viewer-printer comprising an upright supporting column, an elongated housing horizontally mounted atop said column such that its forward portion projects forwardly of the column and over a horizontal work surface on which said column is mounted, transversely extending baffle means mounted in the rear portion of said housing, and an illuminating lamp located within said baffle means, said baffle means forming a restricted channel about the lamp which communicates with an air entrance and an air exit in opposite walls of said housing, a fan mounted in one end of said channel to move cooling air across the lamp, said baffle having an opening between the lamp and the forward end of the housing which permits exit of light rays to the forward end of the housing, a reflector element mounted in said forward end of the housing which receives said light rays and directs them downwardly through a provided opening in the bottom wall of the housing adjacent the forward end thereof to the surface below on which the upright column is mounted, a pair of condenser lenses and an objective lens means fixed forwardly thereof, said condenser lenses and objective lens means being arranged in spaced axial alignment with each other and between said lamp and reflector element, the forward one of said condenser lenses having a flat surface on its side directed toward the objective lens means, said housing including an opening adjacent said flat surface and through which a film may be inserted for positioning against said flat surface of the condenser lens, an axially retractable, resiliently-tensioned, thin, transparent cover element which holds the film against said flat side of the condenser lens, and means by which the axial spacing of the objective lens means and mirror may be adjusted in accordance with their spacing from the condenser lenses and the spacing of the reflector from said supporting surface to accommodate projection of a properly focused magnified image of a so-positioned film onto said supporting surface.

8. A viewer-printer comprising a pedestal, an upright tubular support rising therefrom and atop which support is removably seated a horizontally disposed housing, the major portion of which housing projects forwardly of the upright support, a lamp supported within the housing behind the upright support and a mirror angularly mounted in the forward end of the housing to reflect light rays from said lamp downwardly through a provided opening in the bottom of the housing onto a surface below on which the viewer-printer is mounted, said housing further containing condenser lens means mounted forwardly of the lamp and having a planar front surface and objective lens means mounted forwardly thereof in axially spaced alignment therebetween and the mirror, the housing further having a relatively wide slot in the upper wall thereof immediately adjacent said planar front surface of the condenser lens means and across the width thereof through which film may be inserted, a transparent plate dimensioned to cover said planar surface and including a portion protruding through said slot, and resilient means secured at one end to said housing to either side of said plate adapted for engaging side portions thereof provided adjacent the lower edge thereof for releasably urging the plate against said forward side of the condenser lens means, said transparent plate being retractable by grasping said protruding portion and pivoting the plate about its lower edge against the action of said resilient means to permit insertion and removal of a film from against said planar front surface of the condenser lens means, said plate having a planar rear surface adapted to thereby resiliently urge the film flat against the forward side of the condenser lens means 9. A viewer-printer comprising a pedestal, an upright tubular support rising therefrom and atop which support is removably seated a horizontally disposed housing, the major portion of which housing projects forwardly of the upright support, a lamp supported within the housing behind the upright support and a mirror angularly mounted in the forward end of the housing to reflect light rays from said lamp downwardly through a provided opening in the bottom of the housing onto a surface below on which the viewer-printer is mounted, said housing further containing condenser lens means and objective lens means mounted forwardly thereof in axially spaced alignment between the lamp and mirror, the condenser lens means presenting a planar front surface, the housing having a film receiving slot immediately forwardly of said planar front surface, and means for releasably holding film inserted through said slot against said planar front surface of the condenser lens means comprising an axially movable transparent plate having opposed planar surfaces corresponding to and coextensively arranged with said planar front surface of the condenser lens means, guide means for restricting said plate against latter movement, and actuating means for moving said transparent plate toward and away from the planar front surface of the condenser lens means to permit the insertion and removal of film therebetween.

References Cited by the Examiner

UNITED STATES PATENTS

| | | |
|---|---|---|
| 1,228,912 | 6/1917 | Halldorson. |
| 1,879,600 | 9/1932 | Burchett _____ 352—127 |
| 2,335,189 | 11/1943 | Mayer _____ 88—24 |
| 2,362,601 | 11/1944 | Wengel _____ 88—24 X |
| 2,501,469 | 3/1950 | Kouzminsky. |
| 2,518,282 | 8/1950 | Canady _____ 88—24 X |
| 2,534,084 | 12/1950 | Van Den Broek _____ 88—24 |
| 2,779,236 | 1/1957 | Pollan _____ 88—24 |
| 2,928,316 | 3/1960 | Castellana _____ 88—26 |

NORTON ANSHER, *Primary Examiner.*

WILLIAM MISIEK, EVON C. BLUNK, *Examiners.*

ROBERT D. MUHL, HAROLD H. FLANDERS,
*Assistant Examiners.*